(12) United States Patent
Crowley et al.

(10) Patent No.: US 10,345,830 B2
(45) Date of Patent: Jul. 9, 2019

(54) THERMAL MANAGEMENT SYSTEM CONTROL AND HEAT EXCHANGER LIFE EXTENSION

(71) Applicant: United Technologies Corporation, Farmington, CT (US)

(72) Inventors: Timothy J. Crowley, Tolland, CT (US); Tyler J. Selstad, West Hartford, CT (US); Ding Xibei, Cromwell, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 262 days.

(21) Appl. No.: 15/145,508

(22) Filed: May 3, 2016

(65) Prior Publication Data
US 2017/0322571 A1 Nov. 9, 2017

(51) Int. Cl.
*G06F 19/00* (2018.01)
*G05D 23/02* (2006.01)
(Continued)

(52) U.S. Cl.
CPC ............ *G05D 23/023* (2013.01); *F02C 9/16* (2013.01); *G05B 13/048* (2013.01); *G06Q 10/06* (2013.01); *G06Q 50/06* (2013.01)

(58) Field of Classification Search
None
See application file for complete search history.

(56) References Cited

U.S. PATENT DOCUMENTS 6,490,543 B1 * 12/2002 Jaw .................... G05B 19/4065
340/457.4
8,261,527 B1 9/2012 Stearns et al.
(Continued)

FOREIGN PATENT DOCUMENTS

EP          2952710        12/2015
WO       2014200587       12/2014

OTHER PUBLICATIONS

EP Application No. 17169017.5 EP Search Report dated Jul. 11, 2017, 9 pages.
(Continued)

*Primary Examiner* — Brian W Wathen
*Assistant Examiner* — Hung H Dang
(74) *Attorney, Agent, or Firm* — Cantor Colburn LLP

(57) ABSTRACT

According to an aspect, a method includes generating, by a computer processor, thermo-fluid parameter estimates of a thermal management system (TMS) of an engine based on sensed parameters and monitoring for TMS component failures based on the thermo-fluid parameter estimates and the sensed parameters. Thermo-mechanical parameter estimates are generated based on selected thermo-fluid parameters. Life usage estimates and life usage rate estimates are generated based on the selected thermo-fluid parameters and the thermo-mechanical parameter estimates. Life usage rate targets are generated based on external commands and the life usage estimates. Limits and goals are modified based on the life usage rate estimates, failure flags, and the life usage rate targets. A model predictive control is applied to command one or more TMS control components based on thermo-mechanical model parameters, the failure flags, and the limits and goals.

18 Claims, 4 Drawing Sheets

(51) Int. Cl.
*F02C 9/16* (2006.01)
*G05B 13/04* (2006.01)
*G06Q 10/06* (2012.01)
*G06Q 50/06* (2012.01)

(56) References Cited

U.S. PATENT DOCUMENTS

| | | | |
|---|---|---|---|
| 8,443,582 B1 | 5/2013 | Phillips et al. | |
| 8,720,258 B2 | 5/2014 | Meisner et al. | |
| 2004/0123600 A1* | 7/2004 | Brunell | F02C 9/00 |
| | | | 60/773 |
| 2010/0031624 A1* | 2/2010 | Austin | F02C 7/224 |
| | | | 60/39.5 |
| 2014/0216003 A1 | 8/2014 | Phillips et al. | |

OTHER PUBLICATIONS

EP Application No. 17169017.5 Office Action dated Sep. 27, 2018, 2 pages.

\* cited by examiner

THERMAL MANAGEMENT SYSTEM CONTROL AND HEAT EXCHANGER LIFE EXTENSION

BACKGROUND

This disclosure relates to engine systems, and more particularly to thermal management system (TMS) control and TMS component life extension.

Life extending control (LEC) typically computes adjustments to operational settings of an engine to minimize damage to critical, life-limiting engine components while achieving acceptable engine performance. LEC must balance competing and fundamental tradeoffs between engine component life and performance. LEC typically employs an optimization element to enable adaptation to changing mission requirements, maintenance schedules and component health status.

Compact heat exchangers utilized in aerospace engine systems are particularly prone to thermo-mechanical failures such as thermo-mechanical fatigue due to exposure to high thermal gradients. Extremes of thermo-mechanical stress typically occur during transients such as engine start-up, shut-down, rapid changes in control schedules and control modes. Engine system controls typically target efficient combustion without regard to resulting thermal stresses within oil and fuel system components of the engine.

BRIEF DESCRIPTION

According to an embodiment, a method includes generating, by a computer processor, one or more thermo-fluid parameter estimates of a thermal management system of an engine based on one or more sensed parameters and monitoring for one or more thermal management system component failures of the thermal management system based on the one or more thermo-fluid parameter estimates and the one or more sensed parameters. One or more thermo-mechanical parameter estimates are generated by the computer processor based on one or more selected thermo-fluid parameters. One or more life usage estimates and life usage rate estimates are generated by the computer processor based on the one or more selected thermo-fluid parameters and the one or more thermo-mechanical parameter estimates. One or more life usage rate targets are generated by the computer processor based on one or more external commands and the one or more life usage estimates. One or more limits and goals are modified based on the one or more life usage rate estimates, one or more failure flags from the monitoring for one or more thermal management system component failures, and the one or more life usage rate targets. A model predictive control is applied to command one or more thermal management system control components based on one or more thermo-mechanical model parameters, the one or more failure flags, and the one or more limits and goals.

In addition to one or more of the features described above, or as an alternative to any of the foregoing embodiments, further embodiments may include where thermo-fluid parameter estimation is performed based on a thermal management system thermo-fluid model that is responsive to valve position commands from the model predictive control, the one or more sensed parameters, and the one or more failure flags.

In addition to one or more of the features described above, or as an alternative to any of the foregoing embodiments, further embodiments may include where the one or more limits and goal are modified by a limit and goal modifier to align the one or more life usage rate estimates with the one or more life usage rate targets.

In addition to one or more of the features described above, or as an alternative to any of the foregoing embodiments, further embodiments may include where a component life model generates the one or more life usage estimates for a mission objectives module and the life usage rate estimates for the limit and goal modifier.

In addition to one or more of the features described above, or as an alternative to any of the foregoing embodiments, further embodiments may include where the mission objectives module generates the one or more life usage rate targets, and the one or more external commands reflect one or more mission requirements.

In addition to one or more of the features described above, or as an alternative to any of the foregoing embodiments, further embodiments may include where a thermo-mechanical model generates the one or more thermo-mechanical parameter estimates for the component life model and the one or more thermo-mechanical model parameters for the model predictive control.

In addition to one or more of the features described above, or as an alternative to any of the foregoing embodiments, further embodiments may include where monitoring for one or more thermal management system component failures of the thermal management system includes monitoring for performance degradation of one or more thermal management system components and using estimates of the one or more sensed parameters for sensor failure accommodation.

In addition to one or more of the features described above, or as an alternative to any of the foregoing embodiments, further embodiments may include where applying the model predictive control to command one or more thermal management system control components further includes determining control computations of one or more valve positions to maintain thermo-mechanical parameters within the one or more limits and goals that achieve the one or more life usage rate targets for life-limiting components, and simultaneously minimizing deviations of thermal management system performance parameters from desired goals.

According to an embodiment, a thermal management system of an engine is provided. The thermal management system includes an oil management system, a fuel system, and a controller. The controller generates one or more thermo-fluid parameter estimates of the thermal management system based on one or more sensed parameters and monitors for one or more thermal management system component failures of the thermal management system based on the one or more thermo-fluid parameter estimates and the one or more sensed parameters. The controller generates one or more thermo-mechanical parameter estimates based on one or more selected thermo-fluid parameters. The controller generates one or more life usage estimates and life usage rate estimates based on the one or more selected thermo-fluid parameters and the one or more thermo-mechanical parameter estimates. The controller generates one or more life usage rate targets based on one or more external commands and the one or more life usage estimates. The controller modifies one or more limits and goals based on the one or more life usage rate estimates, one or more failure flags from monitoring for one or more thermal management system component failures, and the one or more life usage rate targets. The controller applies a model predictive control to command one or more thermal management system control components based on one or more thermo-mechanical model parameters, the one or more failure flags, and the one or more limits and goals, where the one or more thermal management system control components include one or more valves of the oil management system and the fuel system.

Technical effects include life extension of TMS components through active control of thermo-mechanical stress parameters and control of fuel system lacquering rates through the use of a fuel temperature target modifier responsive to a fuel lacquering rate model.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments model, estimate, control, and optimize thermal management system (TMS) performance. Embodiments also target component life usage rates by active control of TMS parameters that are correlated with component failure modes and component degradation rates. The thermal management control maintains TMS parameters within limits and goals established to achieve life usage rate targets.

Figure 1:
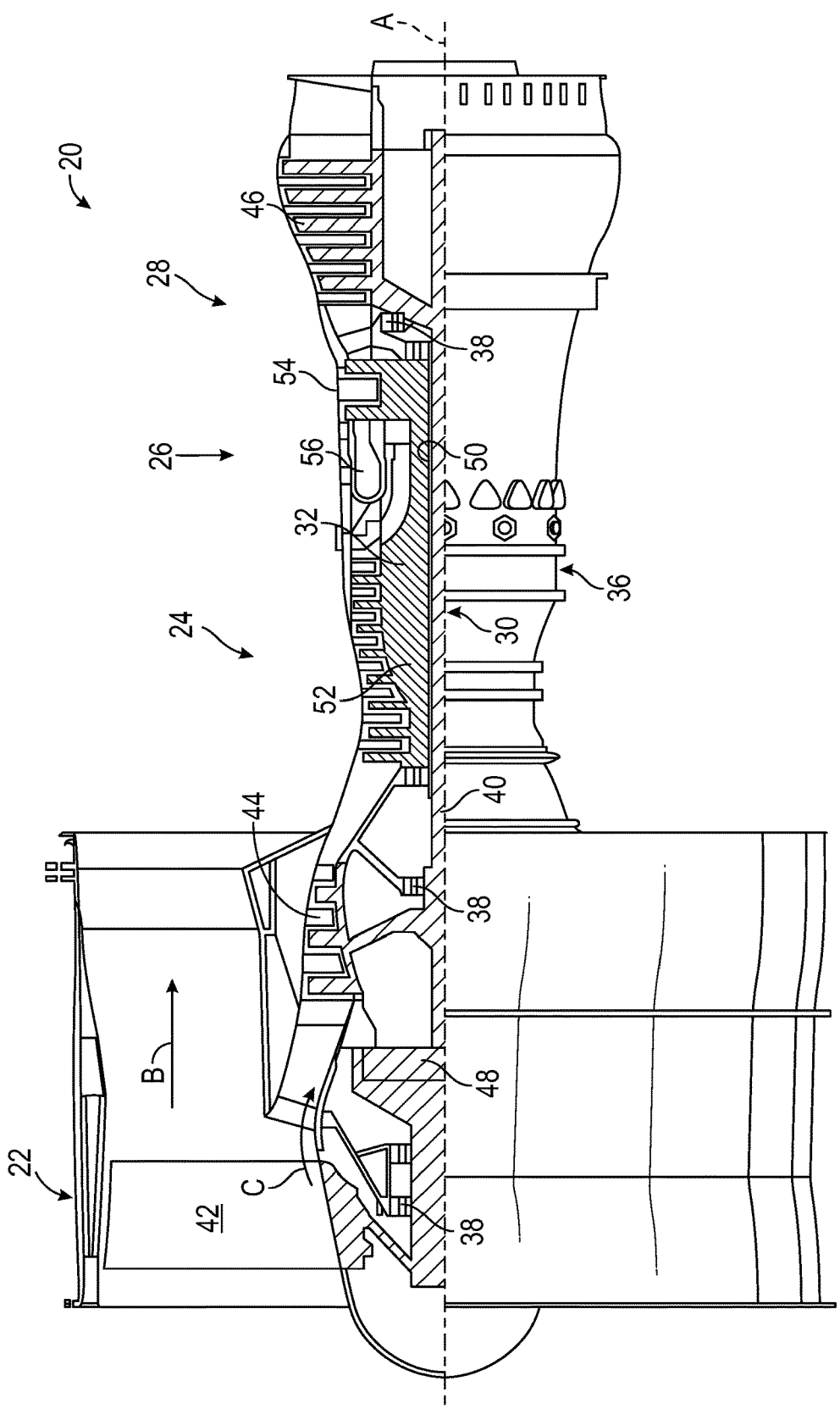
FIG. 1 is a sectional view of one example of a gas turbine engine according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. Additional exemplary embodiments may include engines without a geared architecture.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed"

as disclosed herein according to one non-limiting embodiment is less than about 1150 ft/second (350.5 m/sec).

Figure 2:
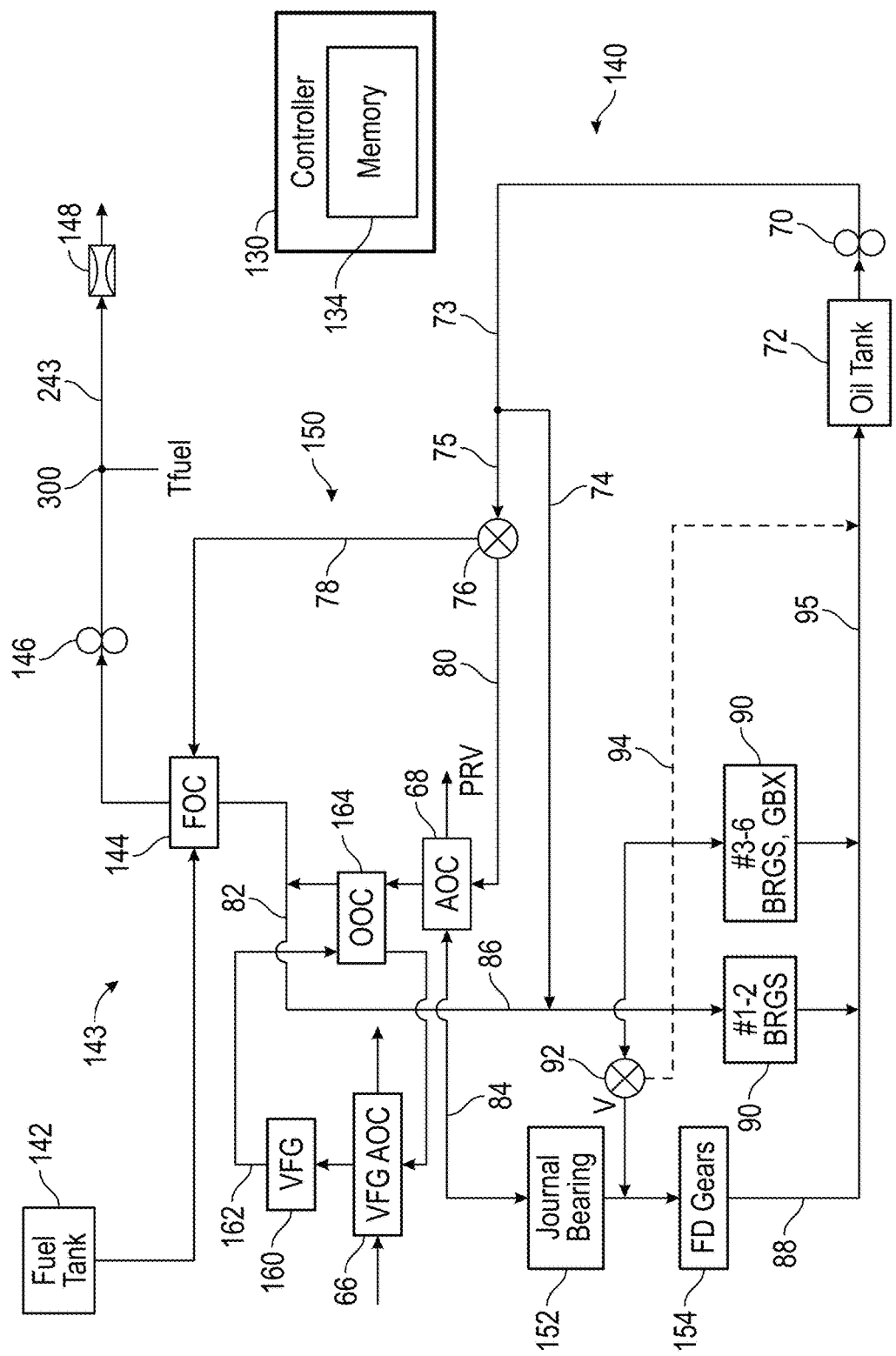
FIG. 2 is a schematic of an oil management system and a fuel system of a gas turbine engine according to an embodiment.

Referring now to FIG. 2, an oil management system 140 and a fuel system 143 are depicted for the gas turbine engine system of FIG. 1. The oil management system 140 is utilized in association with fuel system 143, and a variable frequency generator 160 and its oil cooling system circuit 162.

Fuel from a fuel tank 142 passes to a fuel/oil cooler 144. The fuel is heated, and cools a lubricant, as will be explained below. A main fuel pump 146 drives the fuel into further fuel lines 243 and then into nozzles 148 in a combustor, such as combustor 56 as shown in FIG. 1. It is known in the art to heat the fuel to improve the efficiency of the overall engine. The fuel/oil cooler 144 provides this function.

At the same time, the variable frequency generator 160 is driven by turbine rotors to generate electricity for various uses on an aircraft. As shown in oil cooling system circuit 162, the oil passes through an oil-to-oil cooler 164, and may also pass through an air-to-oil cooler 66 before returning to the variable frequency generator 160.

An oil supply system 150 includes a main oil pump 70 taking oil from a main oil tank 72. The terms "oil" and "lubricant" are used interchangeably in this application and cover a fluid used to lubricate surfaces subject to relative rotation. The oil is delivered through a downstream line 73, and split between two lines 74 and 75. Line 74 is sent directly to line 86 without cooling. A modulating valve 76 is controlled to achieve a desired fuel temperature. As an example, a sensor 300 may send a signal to controller 130 regarding a sensed temperature of the fuel downstream of the fuel oil cooler 144. The valve 76 routes the volume of oil between line 78 and 80 to achieve the desired temperature of the fuel.

The oil passing to line 78 passes through the fuel/oil cooler 144 and heats the fuel. The oil is cooled before returning to a common downstream line 82. The downstream line 82 could be called a "cool" oil line, as the oil will be cooler than the oil in "hot" line 74 which has not been cooled in any heat exchanger. For purposes of this application, line 75 is seen as part of the "cool" line even though the lubricant has yet to be cooled.

The oil directed by the valve 76 into line 80 passes through an air-to-oil cooler at 68 which is exposed to air which is cooler than the oil in line 80, and which cools the oil. Downstream of the air-to-oil cooler 68, the oil passes through the oil-to-oil cooler 164, and may actually be somewhat heated by cooling the oil for the variable frequency generator. Still, the oil reaching line 82 downstream of the oil-to-oil cooler 164 will be significantly cooler than the oil in line 74. Some of the oil in line 82 is directed into a line 84, to a journal bearing 152, and to the fan drive gears 154. Thus, cooler oil is supplied to the bearing 152 and gears 154 than is supplied from the line 74. As can be seen, a line 86 branches off of the "cool" line 82 at or near the point at which "cool" line 84 breaks away to go to the journal bearing 152 and the gears 154. A return line 88 is downstream of the journal bearing 152 and gears 154. The lubricant in line 86 mixes with the lubricant in "hot" line 74, but downstream of the branch line 84.

It is desirable to provide cooler oil to these locations than is necessary to be supplied to bearings 90, or other locations associated with the engine. The bearings 90 as shown in FIG. 2 may equate to the several locations of bearings 38 as shown in FIG. 1. The journal bearing 152 and the fan drive gears 154 would be part of the geared architecture 48 as shown in FIG. 1.

On the other hand, cooling all of the oil associated with the engine bearings 90 would reduce the overall efficiency of the engine. Thus, splitting the oil, and cooling the oil to be directed to the bearings 152 and/or gears 154 provides cooler oil to those locations, while still allowing the hotter oil to be directed to locations that do not need cooler oil.

In addition, a valve 92 can selectively direct additional oil to the gears 154 if additional oil is necessary, such as at high power times. At other times, the valve 92 may direct lubricant through line 94 back to a return line 95 leading back to the oil tank 72.

Controller 130, which may be implemented within a gas turbine engine controller, such as a Full Authority Digital Engine Controller (FADEC) or other electronic engine controller (EEC), can control other components such as valves 76 and 92. To do so, the controller 130 receives various input signals and controls the fuel flow rate to the combustor 56 accordingly. Memory 134 of the controller 130 stores values, algorithms, maps, and other reference data for calculation and/or retrieval by the controller 130 and other components of the fuel system 143. One of ordinary skill will recognize that, in one or more embodiments, common software control and evaluation operations such as calculating, receiving, sending, referencing, and determining are steps conducted by the controller 130 with or without using data stored in the memory 134.

The controller 130 includes one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory 134 may include random access memory (RAM), read only memory (ROM), or other electronic, optical, magnetic, or any other computer readable medium onto which is stored data and algorithms in a non-transitory form. The controller 130 can include other interfaces (not depicted), such as various communication interfaces, input/output interfaces, power supplies, and the like.

The controller 130 can compute position commands of valves 76 and 92 to ensure that heat exchanger 68, 144, 164 thermo-mechanical parameters are controlled within limits established to achieve target component life usage rates, while simultaneously minimizing deviations of TMS thermo-mechanical parameters from corresponding TMS goals. The distinction between goals and limits is primarily one of priority. The TMS goals are desired but not required values for the corresponding TMS parameters. Limits are one-sided and of higher priority than goals, such that the controller 130 computes commands to valves 76 and 92 to ensure that limits are not exceeded. For parameters selected as goals, the controller 130 minimizes deviations of these parameters from corresponding goals. An example of a limit is a maximum oil temperature to prevent bearing lubrication failure. An example of a goal is the combustor fuel temperature target value that mediates a tradeoff between achieving low fuel consumption (high temperature) versus achieving low target lacquering rates (low temperature) in the fuel system. Goals enable tradeoff of objectives for varying mission objectives.

Figure 3:
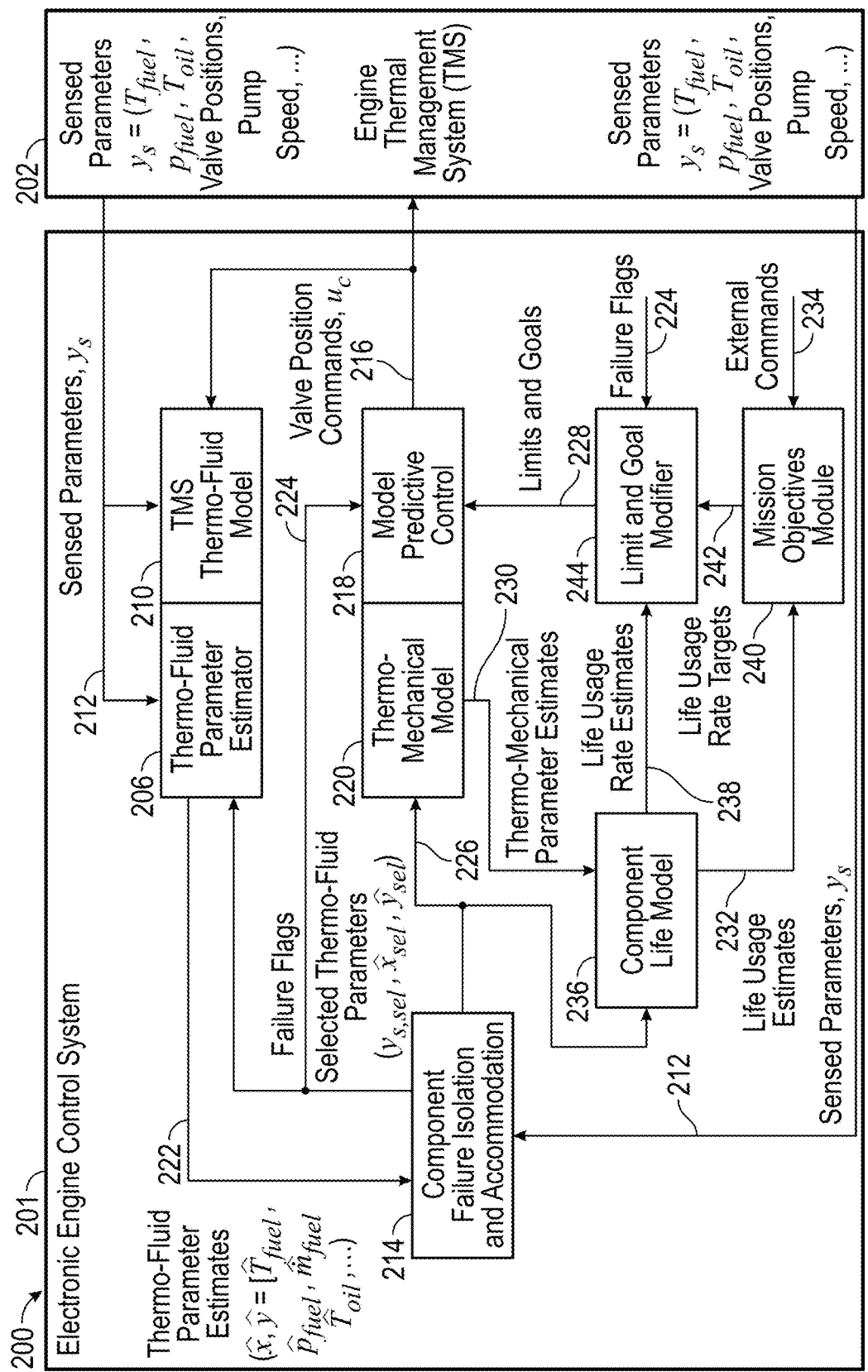
FIG. 3 illustrates a thermal management control system according to an embodiment.

FIG. 3 is an example of a thermal management control system 200 according to an embodiment. The logic flow paths indicated in FIG. 3 reflect one time step in an iteratively repeating real-time control process. The various blocks represent distinct processes performed by an electronic engine control system 201, but may share common hardware such as controller 130 of FIG. 2. A TMS thermo-fluid model 210, thermo-fluid parameter estimator 206, component failure isolation and accommodation 214, thermo-mechanical model 220, model predictive control 218, component life model 236, limit and goal modifier 244, and mission objectives module 240 may be logically separable software algorithms running on a shared processor or multiple parallel processors of a FADEC or other computing device. The electronic engine control system 201 is a digital controller that specifies valve position commands $u_c$ for valve and actuator systems of a gas turbine engine TMS system 202 according to model predictive control laws 218, and based on a plurality of sensed and/or estimated engine, TMS and environmental parameters. In particular, an engine thermal management system 202 provides a plurality of sensed inputs 212 for the component failure isolation and accommodation 214, for the TMS thermo-fluid model 210 and for the thermo-fluid parameter estimator 206, including sensed thermo-fluid, actuation, environmental condition, and engine parameters. The thermo-mechanical model 220 receives selected thermo-fluid parameters 226 from the component failure isolation and accommodation 214. The engine thermal management system 202 receives valve position commands 216 to control valves 76, 92 from model predictive control 218. The valve position commands 216 are also provided to the TMS thermo-fluid model 210. The component failure isolation and accommodation 214 can receive thermo-fluid parameter estimates 222 from the thermo-fluid parameter estimator 206 and provide failure flags 224 to the thermo-fluid parameter estimator 206 and the model predictive control 218. The component failure isolation and accommodation 214 can also provide selected thermo-fluid parameters 226 to the thermo-mechanical model 220. The model predictive control 218 can determine the valve position commands 216 based on a plurality of parameters from the thermo-mechanical model 220, failure flags 224, and limits and goals 228 from the limit and goal modifier 244. The limits and goals 228 can include thermal gradient and thermo-mechanical stress/strain limits and goals, TMS thermal and power consumption limits and goals, and valve rate and range limits. The limit and goal modifier 244 receives life usage rate estimates 238 from the component life model 236 and life usage rate targets 242 from the mission objectives module 240. The mission objectives module 240 receives life usage estimates 232 from the component life model 236 and external commands 234 representing mission requirements. The component life model 236 may receive thermo-mechanical parameter estimates 230 and selected thermo-fluid parameters 226.

Embodiments include a TMS thermo-fluid model 210 that is a physics-based, dynamic model of an air/oil/fuel engine TMS system, and a thermo-fluid parameter estimator 206. The estimator block 206 produces thermo-fluid parameter estimates 222 which are used to update dynamic states of the thermo-mechanical model 220. The thermo-fluid parameter estimator 206 also produces estimates of TMS component performance degradation (e.g., leaks, blockage) and estimates of sensed thermo-fluid parameters for sensor failure accommodation. The thermo-fluid parameter estimates 222 are received by the thermo-mechanical model 220 via the selected thermo-fluid parameters 226. The component failure isolation and accommodation 214 aggregates sensed parameters 212 and thermo-fluid parameter estimates 222 and produces the selected thermo-fluid parameters 226. If failures are isolated in specific sensed parameters 212, the component failure isolation and accommodation 214 replaces the failed sensed value with the corresponding estimated value. The TMS thermo-fluid model 210 can include component models connected through mass and energy continuity equations. The components themselves are based on dynamic conservation laws (mass, energy, momentum). In the case of components such as heat exchangers, complex flow path geometries naturally can lead to complex finite element models, for which conservation equations are applied in each element. To reduce computational complexity, in some embodiments, reduced-order, thermo-fluid models of heat exchangers in the TMS are based on, for example, an effective porous media approach. Dynamic states of the TMS thermo-fluid model 210 include thermo-fluid pressures and temperatures at a plurality of control volumes (nodes) within the TMS system.

Embodiments include thermo-mechanical model 220 for predicting thermo-fluid parameters and heat exchanger thermo-mechanical stress and strain parameters. In some embodiments, the thermo-mechanical model 220 includes an equivalent of the TMS thermo-fluid model 210. In such embodiments, the thermo-mechanical model 220 includes heat exchanger models that compute approximations to the transient temperature, flow and pressure fields within the heat exchangers. Additional equations compute heat exchanger temperature and pressure gradients based on the field variables. The gradients are computed at heat exchanger thermo-mechanical stress concentration points. Locations of these points are determined from off-line finite element analysis. In some embodiments, the model predictive control 218 compares predicted temperature gradients with corresponding limits and goals 228 to achieve life usage rate targets 242. In such embodiments, the model predictive control 218 adjusts valve position commands to maintain temperature gradients within the acceptable limits and goals 228. In other embodiments, the thermo-mechanical model 220 includes an equivalent of the thermo-fluid model 210, and is further augmented with explicit models of heat exchanger thermo-mechanical stress and strain parameters. In such embodiments, the model predictive control 218 adjusts TMS valve position commands 216 to control predicted heat exchanger thermo-mechanical stress and/or strain parameters with respect to the corresponding limits and goals 228. In other embodiments, valve range and rate limit schedules are included in the set of limits and goals 228 and are designed off-line using finite element analysis of TMS heat exchanges during transients associated with high thermo-mechanical stress. In these embodiments, the required valve range and rate limit schedules are designed to achieve target heat exchanger life usage rates when implemented in real-time, thus avoiding the computational burden of computing heat exchanger thermo-mechanical stress/strain parameters onboard.

In some embodiments, a reduced order linear model is generated in real-time and used for computations of the model predictive control 218. The reduced order linear model, and the thermo-mechanical prediction model from which the linear model is derived, are the basis for model predictive control computations of TMS effectors (e.g., valve position(s)) required to accurately control parameters from the thermo-mechanical model 220 to satisfy the corresponding limits and goals 228.

The TMS thermo-fluid model 210 and thermo-mechanical model 220 can be structured as sets of differential-algebraic equations (DAE) representing one or more of the TMS components, and capturing mass, momentum and energy transport within and between TMS components. A high-level mathematical description of the differential and algebraic equations for the TMS thermo-fluid model and thermo-mechanical model are given in Equations 1 and 2 as follows.

$$\dot{x}=f(x,u_b,u_c) \quad \text{(Equation 1)}$$

$$y=g(x,u_b) \quad \text{(Equation 2)}$$

In these equations, x represents system thermo-fluid and thermo-mechanical dynamic states, $u_b$ represents exogenous (uncontrolled) inputs such as boundary and environmental conditions (ambient temperature) and other model inputs that are not commanded by the model predictive control, and $u_c$ represents TMS valve position commands to valves 76 and 92 of FIG. 2. The TMS thermo-fluid model 210 and thermo-mechanical model 220 include a plurality of model parameters, such as material thermodynamic, mechanical, and transport properties, that are not shown in these equations. For embodiments incorporating detailed heat exchanger models, the state vector, x, and vector of outputs, y, include thermo-fluid parameters at a plurality of elements or nodes used to approximate the heat exchanger temperature, pressure and flow fields. In the thermo-mechanical model 220, additional outputs such as spatial material temperature and fluid pressure gradients at stress concentration nodes, are used to compute thermo-mechanical stress parameters. For example, a finite set of spatial material temperature derivatives are indicated in Equation 3, where $e_i$ represent the unit vectors for the $x_i=\{x, y, z\}$ Cartesian position vectors. The gradients are part of the overall output vector, y. $N_{nodes}$ represents the number of nodes in the TMS heat exchanger models.

$$(\nabla T_{m,n})_{n=1,N_{nodes}} = \left(\sum_i e_i \frac{\partial T_{m,n}}{\partial x_i}\right)_{n=1,N_{nodes}} \in y \quad \text{(Equation 3)}$$

The heat exchanger nodal temperatures, pressures and local gradients are computed as part of the thermo-mechanical model of component mass, momentum and energy conservation. The spatial temperature and pressure gradients can be approximated by difference equations applied to state values at contiguous nodes. An example of a difference equation is a first order difference such as $\partial T_{m,n}/\partial z=(T_{m,n}-T_{m,n-1})/(z_i-z_{i-1})$ where the spatial derivative of component material temperature at node n with respect to Cartesian coordinate z is approximated as the difference between the temperature at node n and temperature at node n−1 divided by the distance between the two nodes in the z direction.

In some embodiments, a reduced order model of thermo-mechanical stress parameters can be developed off-line from detailed finite element models and implemented as part of the thermo-mechanical model 220. The reduced order models can be structured to compute principal stress and strain components and/or Von Mises stress at stress concentration nodes as a function of nodal parameter values, nodal gradients, and material thermo-mechanical properties. Equation 4 represents a high level example of a Von Mises stress calculation at a stress concentration point, c, within a heat exchanger;

$$\sigma_{v,c}=g_{v,c}(x,u_b,(\nabla T_{m,n})_{n=1,L},(\nabla p_{m,n})_{n=1,L}) \quad \text{(Equation 4)}$$

In some embodiments, component life models require estimates of strain range. In such cases, thermo-elastic stress and strain calculations are made using finite element models and fundamental stress/strain relations as given in Equation 5, representing thermo-elastic stress and strain relations for small displacements in solids, where C represents the compliance tensor, B represents the thermal expansion tensor, and Θ represents nodal temperature and reference temperature, respectively.

$$\varepsilon=C\sigma+B(\theta-\theta_0) \quad \text{(Equation 5)}$$

The vector of outputs, y, also includes TMS thermo-fluid outputs such as $T_{fuel}$, $T_{oil}$ and parasitic horsepower consumption by the TMS system, as given in Equation 6.

$$\begin{bmatrix} T_{fuel} \\ T_{oil} \\ HPX \end{bmatrix} \in y \quad \text{(Equation 6)}$$

The TMS thermo-fluid model 210 and thermo-mechanical model 220 compute estimates of model dynamic states at the current or k'th time step starting from corresponding state estimates from the preceding time step according to Equation 7.

$$\hat{x}_k^-=\hat{x}_{k-1}+H_{k-1}\cdot f(\hat{x}_{k-1},u_{b,k-1},u_{c,k-1})\Delta t \quad \text{(Equation 7)}$$

Stability of this numerical integration of the state derivative vector, f, is achieved using a stabilization matrix H.

The thermo-fluid parameter estimator 206 compares thermo-fluid parameters generated by the TMS thermo-fluid model 210 with sensed parameters $y_s$ 212 to yield residuals r. The sensed parameters parallel the TMS thermo-fluid model parameters but are taken from appropriate sensors from the TMS system 202. In one embodiment, residuals r take the form of a vector comprising error values indicating a difference between estimated and sensed outputs. The thermo-fluid parameter estimator 206 produces estimates of the system states recursively according to Equation 8.

$$\hat{x}_k=\hat{x}_k^-+K_k\cdot r_k \quad \text{(Equation 8)}$$

The matrix K represents the estimator gain matrix which can be computed off-line and stored as look-up tables or computed in real-time. The thermo-fluid parameter output estimates are given in Equation 9 and include estimates of failure parameters for the component failure isolation and accommodation 214.

$$\hat{y}_k=g(\hat{x}_k,u_{b,k}) \quad \text{(Equation 9)}$$

The component failure isolation and accommodation 214 allows the electronic engine control system 201 to isolate and accommodate faults in the TMS system such as sensor faults, TMS leaks and blockage. The component failure isolation and accommodation 214 uses thermo-fluid parameter estimates 222, along with sensed parameters 212, to isolate and accommodate a set of failures. The component failure isolation and accommodation 214 identifies probable sensor and component hardware faults, selects either sensed or estimated thermo-fluid parameters based on the presence or absence of sensor fault conditions, aggregates the fault-free sensed parameters with the thermo-fluid parameter estimates, and forwards the selected thermo-fluid parameters 226 to the model thermo-mechanical model 220 and sends failure flags 224 to the thermo-fluid parameter estimator 206 and model predictive control 218 to enable reconfiguration for failure conditions. The component failure isolation and accommodation 214 may detect and isolate fault conditions in sensed parameters 212 in a variety of ways, depending on failure type. The component failure isolation and accommodation 214 isolates faults if sensed parameters 212 fall outside of rate or range failure thresholds. In other embodiments, component failure isolation and accommodation 214 isolates faults if changes in sensed parameters 212 across multiple time steps exceed a threshold value. The component failure isolation and accommodation 214 may additionally isolate faults if the absolute value or rate of change in the sensed parameters deviates from the corresponding thermo-fluid parameter estimates 222 by more than a threshold value. In particular, the component failure isolation and accommodation 214 may detect faults if this deviation persists for multiple time steps. The component failure isolation and accommodation 214 accommodates failures in sensed parameters 212 by replacement with the corresponding thermo-fluid parameter estimates 222.

The component failure isolation and accommodation 214 may also detect and isolate component faults such as leakage, blockage, and stuck valves. Component failure detection and isolation methods may include comparison of residual vector, r, magnitudes to failure thresholds. Failure isolation methods may include comparison of observed residual signatures and/or residual directions to a priori signatures associated with known failure modes. Component failure isolation methods may also include maximum likelihood and/or probabilistic estimation algorithms (e.g., Bayesian estimation) and multiple model-based estimation algorithms (e.g., banks of Kalman filters). The component failure isolation and accommodation 214 triggers reconfiguration of the thermo-fluid parameter estimator 206 for failures of sensed parameters 212 and triggers reconfiguration of the model predictive control 218 for actuator and/or valve failures. The component failure isolation and accommodation 214 may utilize any combination of the afore-mentioned fault detection and isolation methods. Failures may also be annunciated to the aircraft to drive maintenance actions.

The purpose of the model predictive control 218 is to manipulate actuators and valves (such as 76, 92 in FIG. 3) to control thermo-fluid and thermo-mechanical parameters within target limits and goals that achieve target life usage rates for life-limiting components and support desired system performance such as achieving a fuel temperature goal high enough to support minimization of fuel consumption. The model predictive control 218 is a predictor-corrector method. The predictor step uses the thermo-mechanical model 220 to predict deviations from the desired limits and goals, if no changes were made to valve 76, 92 position commands. The corrector step uses sensitivities generated from the thermo-mechanical model 220 to determine changes to valve position commands 216, for valves 76, 92, that satisfy the desired limits and goals (i.e., limits and goals 228).

The thermo-mechanical model block 220 can compute base trajectory predictions of dynamic states and output parameters from the current, k'th time step to the k+Np time step, where Np represents the model predictive control prediction horizon and is a control design parameter that influences control dynamic performance and stability.

The thermo-mechanical model 220 computes the predicted state and output vector trajectories by superposition of the base trajectories (predictor step) with corrections to the base trajectories due to valve position command 216 changes (corrector step). Corrections to the base trajectories can be computed using sensitivities relating changes in thermo-fluid and thermo-mechanical parameters to changes in valve position commands 216.

The model predictive control 218 receives limits and goals 228 and tracks the limits and goals to achieve life usage rate targets 242 for components, while simultaneously minimizing deviations of one or more thermo-mechanical model parameters from the corresponding goals in 242.

In some embodiments, the valve position commands 216 for valve 76, 92 positions can be computed by formulating and solving a Quadratic Programming (QP) problem at each update of the control 130. Numerous techniques for formulating and solving such programming problems are known.

The thermo-mechanical and thermo-fluid parameter limits and thermal management system goals, referred to as limits and goals 228 in FIG. 3, are generated by a limit and goal modifier 244. The limits and goals 228 are modified in such a way as to align life usage rate estimates 238 with life usage rate targets 242. The limit and goal modifier 244 receives life usage rate estimates 238 from component life model 236 and receives component life usage rate targets 242 from mission objectives module 240. Because of the coupling between the TMS system life usage rates and fuel system lacquering rates, the component life model 236 includes lacquering rate/life models and receives fuel system sensor information from the aggregated selected thermo-fluid parameters 226. The limit and goal modifier 244 is responsive to failure flags 224 that modify the limits and goals 228 to achieve safe failure accommodation. The component life model 236 is based on thermo-mechanical parameter estimates 230 and selected thermo-fluid parameters 226. The component life model 236 includes component life usage and life usage rate models for life-limiting TMS components (such as heat exchangers) and fuel lacquering rate models for fuel system components. The mission objectives module 240 receives life usage rate estimates 238 from the component life model 236 and one or more external commands 234 reflecting mission requirements. The mission requirements can vary based on external factors such as mission/flight path, fuel cost, and environmental conditions.

Figure 4:
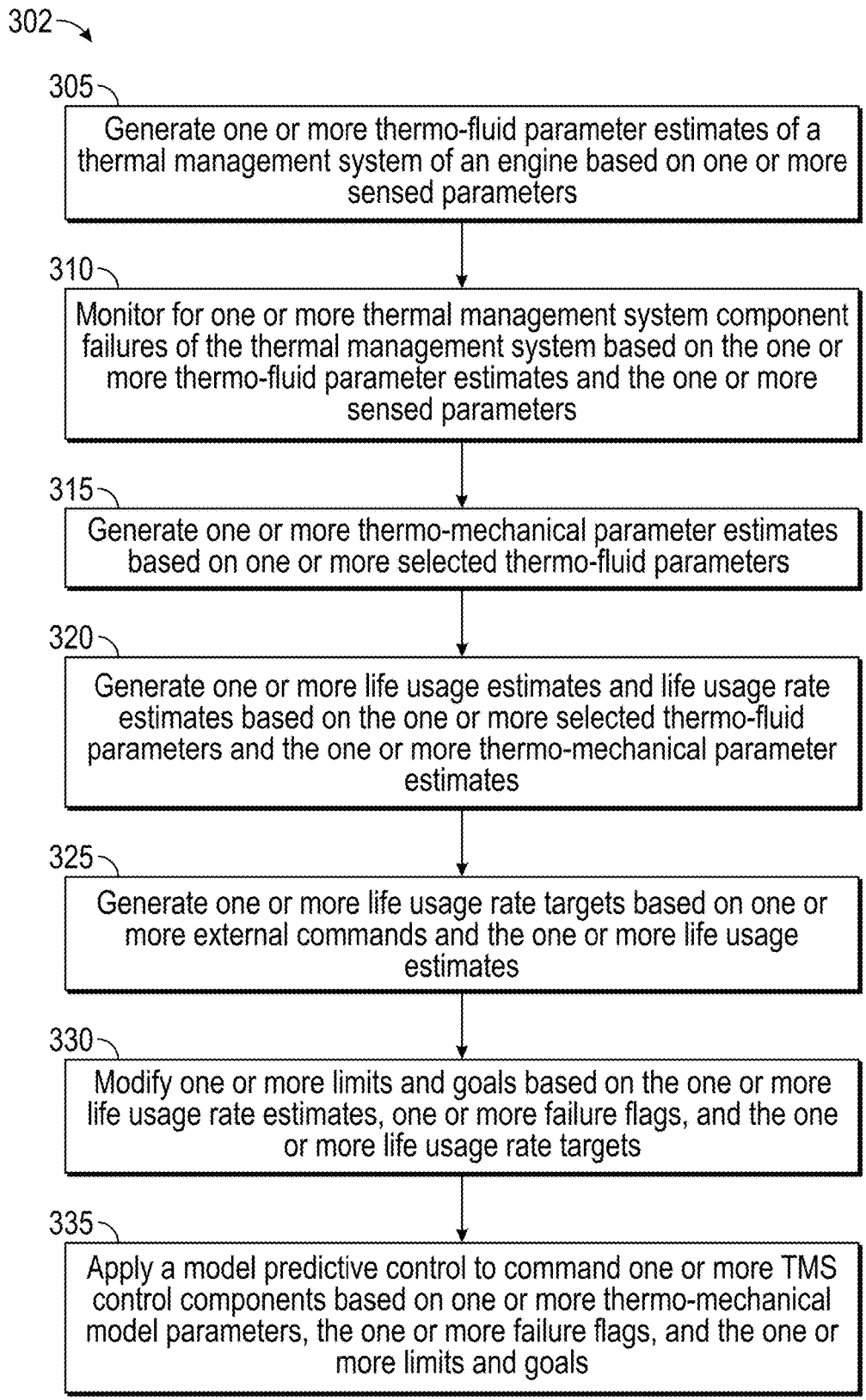
FIG. 4 illustrates a thermal management control process according to an embodiment.

FIG. 4 illustrates a thermal management control process 302 according to an embodiment. At block 305, one or more thermo-fluid parameter estimates 222 of a thermal management system (e.g., engine thermal management system 202 of FIG. 3) are generated based on one or more sensed parameters (e.g., sensed parameters 212 of FIG. 3). Thermo-fluid parameter estimation can be performed based on a thermal management system model, such as TMS thermo-fluid model 210, that is responsive to the commands (e.g., valve position commands 216) from model predictive control 218, sensed parameters 212, and failure flags 224.

At block 310, monitoring is performed for one or more thermal management system component failures of the thermal management system based on one or more thermo-fluid parameter estimates and the one or more sensed parameters, such as monitoring of parameters 212 and estimates 222 by the component failure isolation and accommodation 214 of FIG. 3. Monitoring for one or more thermal management system component failures of the thermal management system can include monitoring for performance degradation of the one or more thermal management system components and using estimates of sensed parameters for sensor failure accommodation.

At block 315, one or more thermo-mechanical parameter estimates 230 are generated based on one or more selected thermo-fluid parameters 226, for instance, by mechanical model 220 of FIG. 3.

At block 320, one or more life usage estimates 232 and life usage rate estimates 238 are generated based on one or more selected thermo-fluid parameters 226 and one or more thermo-mechanical parameter estimates 230 of FIG. 3, for instance, by component life model 236.

At block 325, one or more life usage rate targets 242 are generated based on one or more external commands 234 and one or more life usage estimates 232, for instance, by mission objectives module 240.

At block 330, one or more limits and goals 228 are modified based on one or more life usage rate estimates 238, one or more failure flags 224, and one or more life usage rate targets 242, for instance, by limit and goal modifier 244.

At block 335, a model predictive control 218 is applied to command one or more thermal management system control components based on one or more thermos-mechanical model parameters generated by the thermo-mechanical model 220 of FIG. 3, the failure flags from monitoring of the thermal management system component failures, and the one or more limits and goals 228. The one or more thermo-fluid parameter estimates 222 of the thermal management system can be updated based on the failure flag states, e.g., failure flags 224 of FIG. 3. The model predictive control 218 can be further based on one or more limits and goals 228 of FIG. 3. Applying the model predictive control 218 to command one or more thermal management system control components can include determining control computations of one or more valve positions to maintain thermo-mechanical parameters within the one or more limits and goals 228 that achieve the one or more life usage rate targets 242 for life-limiting components, and simultaneously minimizing deviations of thermal management system performance parameters from desired goals. The limits and goals 228 are modified to achieve component life usage rate targets and simultaneously optimize system efficiency parameters such as fuel consumption minimization.

In summary, embodiments include TMS component failure isolation and control adaption to a failed state. Embodiments use a control system architecture that can manage and coordinate multiple life usage and performance tradeoffs associated with thermal management systems, and do so for changing mission requirements, component health status, and failure conditions. For example, tradeoffs related to fuel temperature management include minimizing fuel consumption (by increasing fuel temperature) and minimizing fuel lacquering rates (by reducing fuel temperature). In some embodiments, a fuel lacquering rate model is used to adjust the fuel temperature goal to achieve a desired lacquering rate aligned with the current state of the fuel system and the current schedule for fuel system maintenance. An optimal tradeoff, for nominal operation, can be overridden by emergence of failure states. In the case of a detected fuel leak, the TMS control architecture can override the fuel temperature goal associated with the lacquering rate target and increases fuel temperature to reduce fuel consumption in support of aircraft safety. From the TMS life extending control perspective, this failure example represents emergence of a component with near-zero remaining life (fuel supply). The TMS life extending control can respond to this new state by modifying limits and goals to extend the life of this severely life-limited subsystem.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
    generating, by a computer processor, one or more thermo-fluid parameter estimates of a thermal management system of an engine based on one or more sensed parameters, the thermal management system comprising one or more heat exchangers in fluid communication with an oil supply system and one or more valves operable to control an oil flow from the oil supply system through the one or more heat exchangers;
    monitoring for one or more thermal management system component failures of the thermal management system based on the one or more thermo-fluid parameter estimates and the one or more sensed parameters;
    generating, by the computer processor, one or more thermo-mechanical parameter estimates based on one or more selected thermo-fluid parameters;
    generating, by the computer processor, one or more life usage estimates and life usage rate estimates based on the one or more selected thermo-fluid parameters and the one or more thermo-mechanical parameter estimates;
    generating, by the computer processor, one or more life usage rate targets based on one or more external commands and the one or more life usage estimates, the one or more life usage rate targets associated with at least the one or more heat exchangers;
    modifying, by the computer processor, one or more limits and goals based on the one or more life usage rate estimates, one or more failure flags from the monitoring for one or more thermal management system component failures, and the one or more life usage rate targets to extend a component life of at least the one or more heat exchangers through thermo-mechanical stress control; and
    commanding a change in one or more valve positions of the one or more valves of the thermal management system to control one or more temperature and pressure of the oil flow through the one or more heat exchangers by the computer processor applying a model predictive control based on one or more thermo-mechanical model parameters, the one or more failure flags, and the one or more limits and goals.

2. The method of claim 1, wherein thermo-fluid parameter estimation is performed based on a thermal management system thermo-fluid model that is responsive to valve position commands from the model predictive control, the one or more sensed parameters, and the one or more failure flags.

3. The method of claim 1, wherein the one or more limits and goal are modified by a limit and goal modifier to align the one or more life usage rate estimates with the one or more life usage rate targets.

4. The method of claim 3, wherein a component life model generates the one or more life usage estimates for a mission objectives module and the life usage rate estimates for the limit and goal modifier.

5. The method of claim 4, wherein the mission objectives module generates the one or more life usage rate targets, and the one or more external commands reflect one or more mission requirements.

6. The method of claim 4, wherein a thermo-mechanical model generates the one or more thermo-mechanical parameter estimates for the component life model and the one or more thermo-mechanical model parameters for the model predictive control.

7. The method of claim 1, wherein monitoring for one or more thermal management system component failures of the thermal management system comprises monitoring for performance degradation of one or more thermal management system components and using estimates of the one or more sensed parameters for sensor failure accommodation.

8. The method of claim 1, wherein applying the model predictive control further comprises determining control computations of the one or more valve positions to maintain thermo-mechanical parameters within the one or more limits and goals that achieve the one or more life usage rate targets for life-limiting components, and simultaneously minimizing deviations of thermal management system performance parameters from desired goals.

9. A thermal management system of an engine, the thermal management system comprising:
   an oil management system comprising:
      an oil supply system;
      one or more heat exchangers in fluid communication with the oil supply system; and
      one or more valves operable to control an oil flow from the oil supply system through the one or more heat exchangers;
   a fuel system thermally coupled to the oil management system; and
   a controller operable to:
      generate one or more thermo-fluid parameter estimates of the thermal management system based on one or more sensed parameters;
      monitor for one or more thermal management system component failures of the thermal management system based on the one or more thermo-fluid parameter estimates and the one or more sensed parameters;
      generate one or more thermo-mechanical parameter estimates based on one or more selected thermo-fluid parameters;
      generate one or more life usage estimates and life usage rate estimates based on the one or more selected thermo-fluid parameters and the one or more thermo-mechanical parameter estimates;
      generate one or more life usage rate targets based on one or more external commands and the one or more life usage estimates, the one or more life usage rate targets associated with at least the one or more heat exchangers;
      modify one or more limits and goals based on the one or more life usage rate estimates, one or more failure flags from monitoring for one or more thermal management system component failures, and the one or more life usage rate targets to extend a component life of at least the one or more heat exchangers through thermo-mechanical stress control; and
      apply a model predictive control to command the one or more valves to control one or more temperature and pressure of the oil flow through the one or more heat exchangers based on one or more thermo-mechanical model parameters, the one or more failure flags, and the one or more limits and goals.

10. The thermal management system of claim 9, wherein thermo-fluid parameter estimation is performed based on a thermal management system thermo-fluid model that is responsive to valve position commands from the model predictive control, the one or more sensed parameters, and the one or more failure flags.

11. The thermal management system of claim 9, wherein the one or more limits and goal are modified by a limit and goal modifier to align the one or more life usage rate estimates with the one or more life usage rate targets.

12. The thermal management system of claim 11, wherein a component life model generates the one or more life usage estimates for a mission objectives module and the life usage rate estimates for the limit and goal modifier.

13. The thermal management system of claim 12, wherein the mission objectives module generates the one or more life usage rate targets, and the one or more external commands reflect one or more mission requirements.

14. The thermal management system of claim 12, wherein a thermo-mechanical model generates the one or more thermo-mechanical parameter estimates for the component life model and the one or more thermo-mechanical model parameters for the model predictive control.

15. The thermal management system of claim 9, wherein monitoring for one or more thermal management system component failures of the thermal management system comprises monitoring for performance degradation of one or more thermal management system components and using estimates of the one or more sensed parameters for sensor failure accommodation.

16. The thermal management system of claim 9, wherein application of the model predictive control to command one or more thermal management system control components further comprises determining control computations of one or more valve positions to maintain thermo-mechanical parameters within the one or more limits and goals that achieve the one or more life usage rate targets for life-limiting components, and simultaneously minimizing deviations of thermal management system performance parameters from desired goals.

17. The method of claim 1, wherein monitoring for one or more thermal management system component failures comprises monitoring for one or more of: a heat exchanger leak, a heat exchanger blockage, and a stuck valve of the one or more valves.

18. The thermal management system of claim 9, wherein monitoring for one or more thermal management system component failures comprises monitoring for one or more of: a heat exchanger leak, a heat exchanger blockage, and a stuck valve of the one or more valves.

* * * * *